US012061499B2

(12) United States Patent
Schwartzel et al.

(10) Patent No.: US 12,061,499 B2
(45) Date of Patent: Aug. 13, 2024

(54) COMPUTING DEVICE HINGE WITH SLIDING COVER

(71) Applicant: Microsoft Technology Licensing, LLC, Redmond, WA (US)

(72) Inventors: Luke Schwartzel, Bothell, WA (US); Brett Tomky, Seattle, WA (US); Devin Samuel Jacob Caplow-Munro, Seattle, WA (US); Denys Yaremenko, Carnation, WA (US); Errol Mark Tazbaz, Bellevue, WA (US); Anne Maristella Pirie, Peninsula, OH (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 80 days.

(21) Appl. No.: 17/706,078

(22) Filed: Mar. 28, 2022

(65) Prior Publication Data
US 2023/0315160 A1  Oct. 5, 2023

(51) Int. Cl.
*G06F 1/16* (2006.01)
(52) U.S. Cl.
CPC .......... *G06F 1/1681* (2013.01); *G06F 1/1616* (2013.01)
(58) Field of Classification Search
CPC ............................ G06F 1/1681; G06F 1/1616
See application file for complete search history.

(56) References Cited

U.S. PATENT DOCUMENTS 9,235,239 B2 * 1/2016 van Dijk ................. G09F 9/301
9,557,771 B2  1/2017 Park et al.
(Continued)

FOREIGN PATENT DOCUMENTS

| EP | 3702881 A1 | 9/2020 |
| WO | 2021096536 A1 | 5/2021 |
| WO | 2021150360 A1 | 7/2021 |

OTHER PUBLICATIONS

Adnan, Minhaj, "BOE Showcases 360-Degree Display for Foldable Phones", Retrieved From: https://www.siasat.com/boe-showcases-360-degree-display-for-foldable-phones-2101509/, Mar. 2, 2021, 7 Pages.

(Continued)

*Primary Examiner* — Anthony M Haughton
*Assistant Examiner* — Theron S Milliser
(74) *Attorney, Agent, or Firm* — Holzer Patel Drennan

(57) ABSTRACT

Hinged computing devices often connect two components via one or more hinges, using either a door-hinge style or other conventional hinge style. Presenting a continuous visual impression of the computing device to the user, with any gaps covered, provides protection to internal components and suggests a higher overall quality of the computing device to the user. Using conventional hinges, achieving a 360-degree range of motion is difficult, and often requires a pair of hinges connected by a spine to accommodate the respective thicknesses of the two hinged components in all orientations. However, using a pair of conventional hinges connected by a spine to achieve a 360-degree range of motion can yield a variable gap between the spine and the hinged components. The presently disclosed technology is directed to mechanically deterministic sliding covers that conceal these variable gaps, while still maintaining a 360-degree range of motion of the computing device.

20 Claims, 7 Drawing Sheets

(56) References Cited

U.S. PATENT DOCUMENTS

| | | | |
|---|---|---|---|
| 9,845,625 B2 | 12/2017 | Park | |
| 9,874,906 B1 * | 1/2018 | Hsu | G06F 1/1681 |
| 10,429,896 B2 * | 10/2019 | Kuramochi | G06F 1/1681 |
| 10,459,492 B2 | 10/2019 | Chen et al. | |
| 10,488,882 B2 * | 11/2019 | Määttä | G06F 1/1616 |
| 10,520,989 B1 * | 12/2019 | Hsu | G06F 1/1616 |
| 10,599,189 B1 * | 3/2020 | Hsu | G06F 1/1681 |
| 10,817,030 B2 * | 10/2020 | Pelissier | G06F 1/1641 |
| 10,901,457 B2 | 1/2021 | Ou et al. | |
| 11,032,929 B2 | 6/2021 | Yoo et al. | |
| 11,137,801 B2 | 10/2021 | Park et al. | |
| 11,337,321 B2 * | 5/2022 | Jia | H05K 5/0226 |
| 11,406,026 B2 * | 8/2022 | Van Dijk | H05K 5/0226 |
| 11,435,786 B2 * | 9/2022 | Pelissier | G06F 1/1641 |
| 11,768,524 B2 * | 9/2023 | Siddiqui | G06F 1/1656 |
| | | | 361/679.01 |
| 2013/0010405 A1 * | 1/2013 | Rothkopf | H05K 5/0226 |
| | | | 361/679.01 |
| 2013/0021762 A1 * | 1/2013 | van Dijk | H04M 1/022 |
| | | | 361/749 |
| 2016/0143162 A1 * | 5/2016 | Van Dijk | G06F 1/1681 |
| | | | 361/679.01 |
| 2016/0342180 A1 | 11/2016 | Xin et al. | |
| 2018/0049336 A1 | 2/2018 | Manuel et al. | |
| 2018/0067520 A1 * | 3/2018 | Määttä | G06F 1/1681 |
| 2019/0086965 A1 * | 3/2019 | Kuramochi | G06F 1/1652 |
| 2019/0391618 A1 * | 12/2019 | Hsu | G06F 1/1616 |
| 2020/0225711 A1 * | 7/2020 | Pelissier | G06F 1/1624 |
| 2020/0281085 A1 * | 9/2020 | Jia | G06F 1/1681 |
| 2021/0018963 A1 * | 1/2021 | Pelissier | G06F 1/1681 |
| 2021/0265588 A1 | 8/2021 | Yang | |
| 2021/0365072 A1 | 11/2021 | Kinoshita et al. | |
| 2021/0397226 A1 * | 12/2021 | Siddiqui | G06F 1/1681 |
| 2022/0322543 A1 * | 10/2022 | Van Dijk | H05K 5/0017 |
| 2023/0292455 A1 * | 9/2023 | Caplow-Munro | H05K 5/0226 |
| | | | 361/807 |
| 2023/0315160 A1 * | 10/2023 | Schwartzel | G06F 1/1681 |
| | | | 361/679.27 |

OTHER PUBLICATIONS

Vasan, G.S., "Best Foldable and Rollable Phones in 2022", Retrieved From: https://web.archive.org/web/20220208042815/https://www.smartprix.com/bytes/best-foldable-phones/, Feb. 8, 2022, 9 Pages.

"International Search Report and Written Opinion Issued in PCT Application No. PCT/US22/054309", dated May 8, 2023, 11 Pages.

* cited by examiner

COMPUTING DEVICE HINGE WITH SLIDING COVER

Computing devices encompass a variety of devices that can be programmed to carry out one or more specific sets of arithmetic and/or logical operations, with or without user input. Some computing devices utilize one or more hinges to pivotally connect two or more components of the computing device. Conventionally, such computing device hinges often take the form of a door-hinge style or other conventional hinge style.

SUMMARY

Implementations described and claimed herein provide a computing device hinge comprising: a first device chassis forming a fixed reference; a dual pivot link hingedly attached to the first device chassis; a sliding cover hingedly attached to the dual pivot link; and a hinge guide hingedly attached to the first device chassis, the sliding cover co-planar with and slidably attached to the hinge guide, wherein the sliding cover translates along the hinge guide across a range of hinged motion of the computing device hinge.

Implementations described and claimed herein further provide a method of manufacturing a computing device hinge comprising: provide a device spine forming a fixed reference; hingedly connect a first dual pivot link to a first side of the device spine; hingedly connect a second dual pivot link to a second side of the device spine; hingedly connect a first sliding cover to the first dual pivot link; hingedly connect a second sliding cover to the second dual pivot link; hingedly connect a first hinge guide to the first side of the device spine; slidably connect the first sliding cover co-planar with the first hinge guide, wherein the first sliding cover is translatable along the first hinge guide across a range of hinged motion of the computing device hinge; hingedly connect a second hinge guide to the second side of the device spine; and slidably connect the second sliding cover co-planar with the second hinge guide, wherein the second sliding cover is translatable along the second hinge guide across the range of hinged motion of the computing device hinge.

Implementations described and claimed herein still further provide a computing device hinge comprising: a device spine forming a fixed reference; a first dual pivot link hingedly attached to a first side of the device spine; a second dual pivot link hingedly attached to a second side of the device spine; a first sliding cover hingedly attached to the first dual pivot link; a second sliding cover hingedly attached to the second dual pivot link; a first hinge guide hingedly attached to the first side of the device spine, the first sliding cover co-planar with and slidably attached to the first hinge guide, wherein the first sliding cover translates along the first hinge guide across a range of hinged motion of the computing device hinge; and a second hinge guide hingedly attached to the second side of the device spine, the second sliding cover co-planar with and slidably attached to the second hinge guide, wherein the second sliding cover translates along the second hinge guide across the range of hinged motion of the computing device hinge.

Other implementations are also described and recited herein. This Summary is provided to introduce a selection of concepts in a simplified form that are further described below in the Detailed Descriptions. This Summary is not intended to identify key features or essential features of the claimed subject matter, nor is it intended to be used to limit the scope of the claimed subject matter.

BRIEF DESCRIPTIONS OF THE DRAWINGS

DETAILED DESCRIPTIONS

A conventional door-hinge style hinge is visibly contiguous with each of two hinged components, where one is rotatable with regard to the other of the two hinged components. To achieve a wide range of motion, the door-hinge style hinge may yield a discontinuous visual impression to the user as a visual gap between the hinged components. Further, a conventional door-hinge style hinge is incapable of achieving a full 360-degree range of motion.

Conventional laptop computers may utilize one or more door-hinge style hinges to connect a display component with a keyboard component of a laptop computer. Other computing devices may have a similar configuration with two components connected via one or more hinges, using a door-hinge style or other conventional style. In all computing devices, presenting a continuous visual impression of the computing device to the user, with any gaps covered, provides protection to internal components, and suggests a higher overall quality of the computing device to the user, and is thus desirable.

Using either conventional door-hinge style hinges, achieving a 360-degree range of motion is difficult, and often requires a pair of hinges connected by a spine to accommodate the respective thicknesses of the two hinged components in a 0-degree orientation, a 360-degree orientation, and all orientations therebetween. However, using a pair of conventional hinges connected by a spine to achieve a 360-degree range of motion can yield a variable gap between the spine and the hinged components to accommodate the respective thicknesses of the two hinged components. The presently disclosed technology is directed to mechanically deterministic sliding covers that conceal these variable gaps, while still maintaining a 360-degree range of motion of the computing device.

Figure 1:
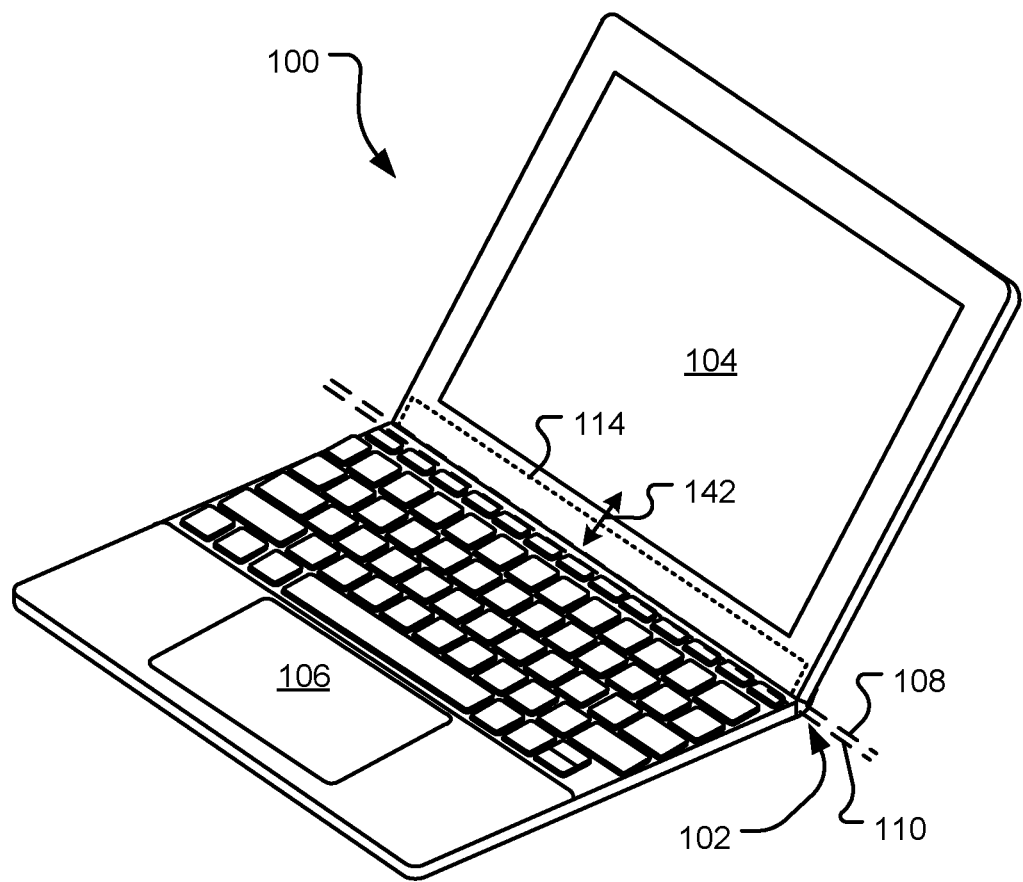
FIG. 1 is a top perspective view of an example computing device having a hinge with a sliding cover.

FIG. 1 is a top perspective view of an example computing device 100 having a hinge 102 with a sliding cover 114. The hinge 102 pivotally connects a display component (or first hinged component) 104 with a keyboard component (or second hinged component) 106 of the device 100. As a result, a user may position the display component 104 at a variety of angles with respect to the keyboard component 106 to achieve a desired viewing angle to the display component 104, or for other user considerations. Further, the display component 104 may be selectively separable from the keyboard component 106.

The device 100 is depicted as a laptop computer, however, the hinge 102 may be similarly incorporated within a variety of computing devices, including mobile computing devices and desktop computing devices. Further, while the display component 104 and the keyboard component 106 are illustrated, and discussed in detail herein, the computing device 100 may include any two or more hinged components (e.g., a keyboard, a display screen, a touchscreen, a touchpad, a kickstand, a screen cover, and combinations thereof).

For example, another computing device may be a 2-screen device and the hinge 102 may permit the 2-screen computing device to cover both screens within the computing device when oriented at 0-degrees and present both screens on opposing sides of the computing device when oriented at 360-degrees. Further, the computing device may lay flat where the hinge 102 is oriented at 180-degrees and present the screens in close proximity to one another and in the same flat plane with only a small gap or no gap therebetween to a user.

For further example, yet another computing device may be a foldable 1-screen device that spans both of the hinged components (see e.g., FIG. 2, discussed in detail below). The hinge 102 may permit the 1-screen computing device to overlap itself and conceal the screen within the computing device when oriented at 0-degrees and present the entire screen spanning opposing sides of the computing device when oriented at 360-degrees. Further, the computing device may lay flat where the hinge 102 is oriented at 180-degrees and present the screen in one flat plane to a user.

An example implementation of the hinge 102 is designed to pivot about pivot axes 108, 110 running between the display component 104 and the keyboard component 106 to achieve a substantially 360-degree operating range. One or more sliding covers (e.g., sliding cover 114, illustrated in broken lines as it is hidden from view) are used to conceal variable gaps between the components 104, 106 and the hinge 102. The sliding cover 114 is slidably attached to the hinged component 104, thereby limiting movement to translation in the directions of arrow 142. The operating range of the hinge 102 may range from fully closed (or where the display component 104 overlies the keyboard component 106 on one side with a 0-10 degree angle therebetween) to fully open (or where the display component 104 overlies the keyboard component 106 on an opposite side with a 0-10 degree angle therebetween), which is referred to herein as a substantially 360-degree operating range.

Other implementations may utilize a singular pivot axis (approximately one-half of the hinge 102 discussed in detail herein). The operating range of such a hinge may range from fully closed (or where the display component 104 overlies the keyboard component 106 on one side with a 0-10 degree angle therebetween) to fully open (or where the display component 104 is oriented at a maximum oblique angle with reference to the keyboard component 106, which may include an approximately 180-degree angle (i.e., 170-190 degrees) therebetween), which is referred to herein as a substantially 180-degree operating range.

Figure 2A:
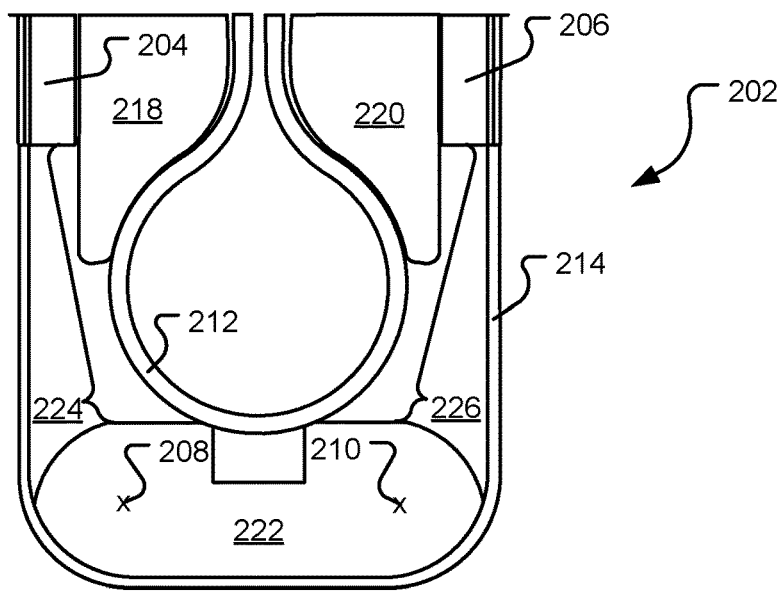
FIG. 2A is a sectional view of an example computing device hinge with a flexible display screen at a 0-degree orientation having a hinge with sliding covers.

FIG. 2A is a sectional view of an example computing device hinge 202 with a flexible display screen 212 at a 0-degree orientation having a hinge 202 with sliding cover 214. The hinge 202 pivotally connects first hinged component 204 (e.g., a first midframe or chassis) with a second hinged component 206 (e.g., a second midframe or chassis) of a computing device. As a result, a user may position the first hinged component 204 at a variety of angles with respect to the second hinged component 206 to achieve a desired orientation of the flexible display screen 212, or for other user considerations.

The hinge 202 may be incorporated within a variety of computing devices, including mobile computing devices and desktop computing devices. Further, while the first midframe 204, second midframe 206, and the flexible display screen 212 are illustrated, and discussed in detail herein, the computing device may include any two or more hinged components (e.g., a keyboard, a display screen, a touchscreen, a touchpad, a kickstand, a screen cover, and combinations thereof).

The computing device is illustrated as a foldable 1-screen device with the flexible touch display module (TDM or display screen) 212 spanning both of the hinged components 204, 206. A challenge with this arrangement is that in order to selectively wrap the display screen around device spine 222 depending on device angular orientation, the hinged components 204, 206 are of a varying distance from pivot axes 208, 210, respectively (discussed in detail below). To accommodate this, the hinged components 204, 206 overlap the sliding cover 214, thereby allowing the sliding cover 214 to make up the varying distance between the hinged components 204, 206.

The hinge 202 permits the computing device to overlap itself and conceal the flexible display screen 212 within the computing device when oriented at 0-degrees, as illustrated in FIG. 2A. More specifically, the flexible display screen 212 is permitted to fold over itself within the hinge 202 using at least a minimum radius of curvature designed to prevent damage to the flexible display screen 212 in the depicted 0-degree orientation. Further, screen supports 218, 220 provide structural backing for the flexible display screen 212 and help to define the radius of curvature of the display screen 212 in the depicted 0-degree orientation. In some implementations, the sliding cover 214 drives one or more further display supports (not shown) to provide further structural backing for the flexible display screen 212 that varies based on the computing device angular orientation. A device spine 222 still further provides structural backing for the flexible display screen 212 and further helps to define the radius of curvature of the display screen 212 in the depicted 0-degree orientation.

Figure 4A:
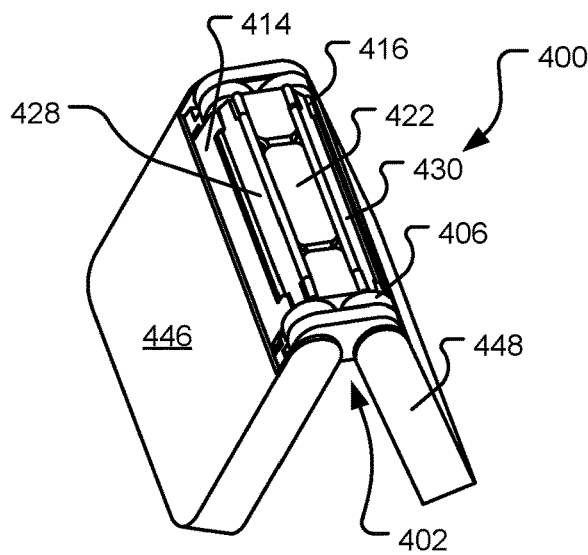
FIG. 4A is a bottom perspective view of an example computing device having a hinge at an approximately 45-degree orientation with a pair of sliding covers.
Figure 4B:
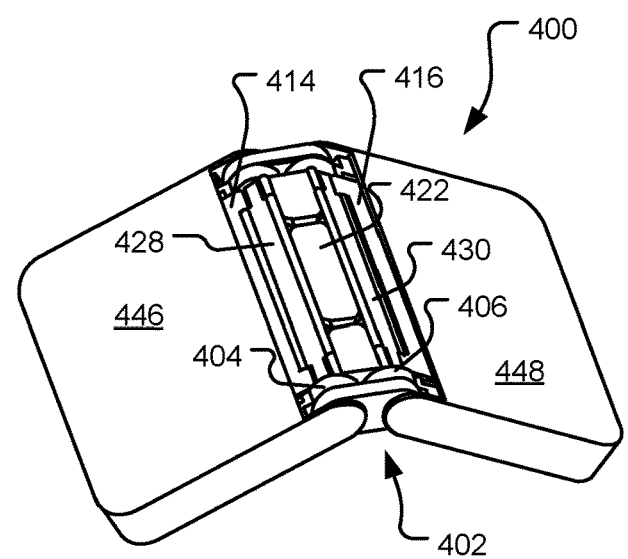
FIG. 4B is a bottom perspective view of the example computing device of FIG. 4A at an approximately 135-degree orientation.
Figure 4C:
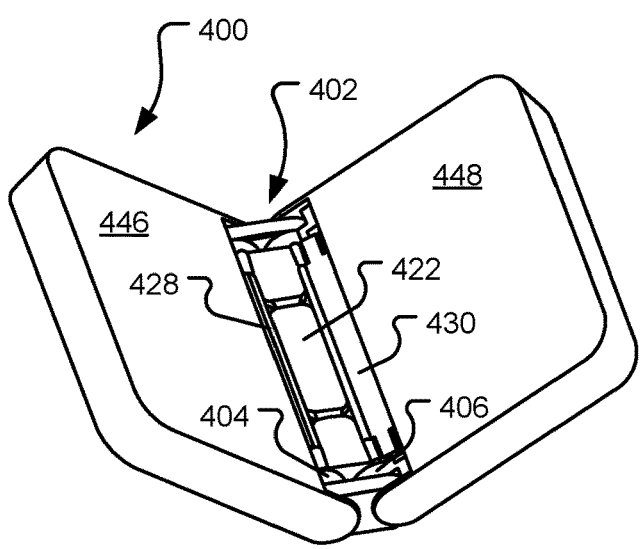
FIG. 4C is a bottom perspective view of the example computing device of FIGS. 4A and 4B at an approximately 250-degree orientation.

In various implementations, the hinged components 204, 206 overlap the sliding cover thereby concealing gaps 224, 226 between the hinged components 204, 206 and the device spine 222. The sliding cover 214 is depicted in its maximum extension orientation in FIG. 2A as a distance between the hinged components 204, 206 about a perimeter of the hinge 202 is at a maximum in the depicted 0-degree orientation. While the sliding cover 214 is depicted in FIG. 2A as a singular continuous structure extending linking the hinged components 204, 206 across the device spine 222, in other implementations, the sliding cover 214 is a pair of sliding covers oriented on each side of the hinge and each linking one of the hinged components to the device spine, as shown in FIGS. 4A-4C and described in detail below. Absent the sliding cover 214, a backside of the folded display screen 212 would be visible through the hinge 202, which is not desirable.

The hinge 202 is designed to pivot about pivot axes 208, 210 running between the hinged components 204, 206 and the device spine 222 to achieve a substantially 360-degree operating range. Other implementations may utilize a singular pivot axis (approximately one-half of the hinge 202 discussed in detail herein) to achieve a substantially 180-degree operating range.

Figure 2B:
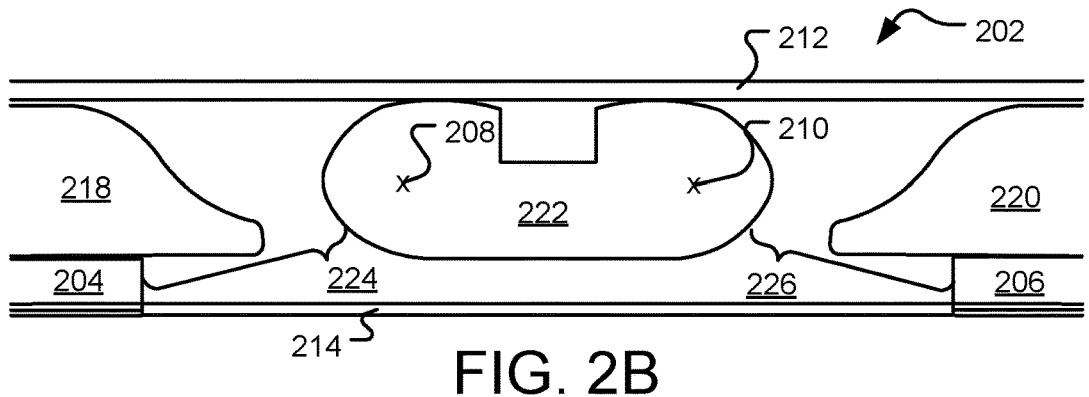
FIG. 2B is a sectional view of the example computing device hinge of FIG. 2A at a 180-degree orientation.

FIG. 2B is a sectional view of the example computing device hinge 202 of FIG. 2A at a 180-degree orientation. The hinge 202 permits the flexible display screen 212 to lay flat when oriented at 180-degrees and present the screen in one flat plane to a user. Further, while the screen supports 218, 220 and the device spine 222 provide some structural backing for the flexible display screen 212 in the depicted 180-degree orientation, a large gap (e.g., approximately 8 mm) may exist that leaves the flexible display screen 212 partially unsupported.

In various implementations, the hinged components 204, 206 overlap the sliding cover 214 thereby concealing gaps 224, 226 between the hinged components 204, 206 and the device spine 222. The sliding cover 214 is depicted in a partial extension orientation in FIG. 2B as a distance between the hinged components 204, 206 about a perimeter of the hinge 202 is between that of FIGS. 2A and 2C in the depicted 180-degree orientation. Thus, the gaps 224, 226 of FIG. 2B are smaller than the gaps 224, 226 of FIG. 2A. Absent the sliding cover 214, a backside of the folded display screen 212 would be visible through the hinge 202, which is not desirable.

Figure 2C:
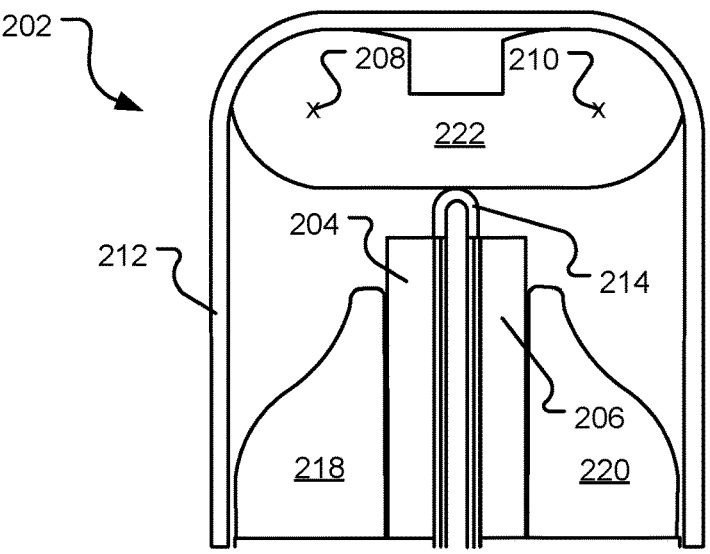
FIG. 2C is a sectional view of the example computing device hinge of FIGS. 2A and 2B at a 360-degree orientation.

FIG. 2C is a sectional view of the example computing device hinge 200 of FIGS. 2A and 2B at a 360-degree orientation. The hinge 202 permits the computing device to overlap itself with the flexible display screen 212 exposed on an outside of the computing device when oriented at 360-degrees, as illustrated in FIG. 2C. Further, the screen supports 218, 220 and the device spine 222 still provide structural backing for the flexible display screen 212 in the depicted 360-degree orientation. In various implementations, the hinged components 204, 206 overlap the sliding cover, but are in a fully retracted orientation in FIG. 2C as a distance between the hinged components 204, 206 about a perimeter of the hinge 202 is at a minimum in the depicted 360-degree orientation.

Figure 3:
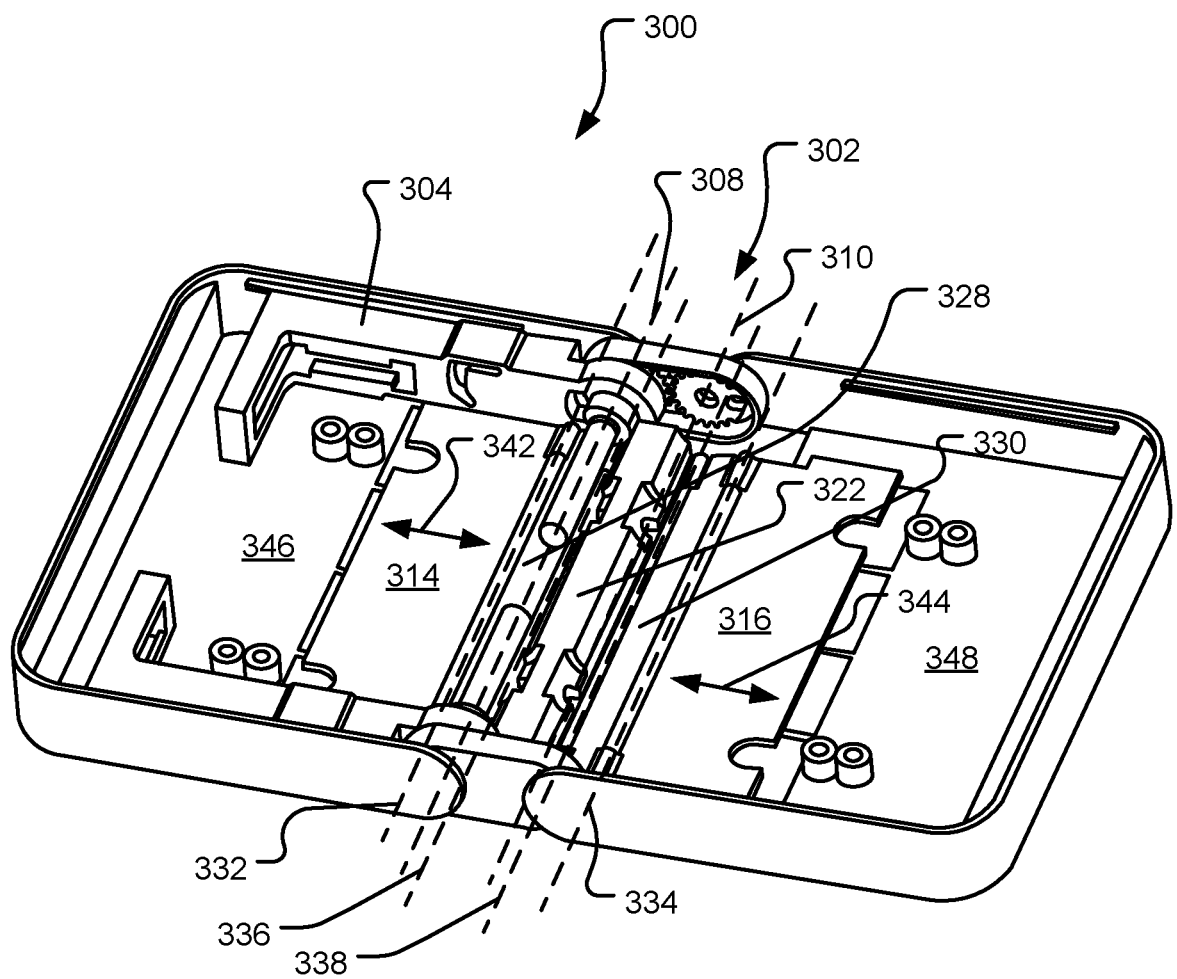
FIG. 3 is a top perspective view of an example computing device chassis having a hinge with a sliding cover at a 180-degree orientation.

FIG. 3 is a top perspective view of an example computing device 300 having a hinge 302 at a 180-degree orientation with a pair of sliding covers 314, 316. The hinge 302 pivotally connects first hinged component (or hinge guide) 304 to a second hinged component (or hinge guide, not shown, mirror image of hinge guide 304) of the computing device 300, which is not drawn to scale. The computing device 300 further includes a first device chassis 346 and a second device chassis 348, each of which is fixedly or slidably attached to their respective hinge guides. In implementations where the device chassis 346, 348 are slidably attached to their respective hinge guides, movement of the device chassis 346, 348 with reference to their respective hinge guides may be dependent upon or independent of movement of the sliding covers 314, 316 (described in detail below) with reference to their respective hinge guides.

In implementations where one or both of the device chassis 346, 348 are fixedly attached to their respective hinge guides, the overall design is simplified with fewer moving parts. Such simplification is technically advantageous if slidable connections are not necessary for either or both of the device chassis 346, 348. Implementations where the device chassis 346, 348 are slidably attached to their respective hinge guides (and independent of movement of the sliding covers 314, 316, respectively) are technically advantageous where an exterior perimeter of the computing device 300 is intended to maintain a fixed dimension across a variety of orientations of the device chassis 346, 348 (e.g., when using 1-screen foldable device with a flexible touch display module (TDM), such as that shown in FIG. 2) and described in further detail below.

More specifically, movement of the device chassis 346, 348 with reference to their respective hinge guides is linked to the computing device 300 angular orientation. For example, in a 1-screen foldable device with a flexible touch display module (TDM), such as that shown in FIG. 2, the device chassis 346, 348 translates along their respective hinge guides, which is driven by a fixed dimension of the TDM but changing dimension between the device chassis 346, 348 based on computing device 300 angular orientation. In other implementations, movement of the device chassis 346, 348 with reference to their respective hinge guides in mechanically deterministic based on the computing device 300 angular orientation to accommodate other constraints of the computing device 300.

A user may position the first device chassis 346 at a variety of angles with respect to the second device chassis 348 to achieve a desired orientation of the device chassis 346, 348, or for other user considerations. The hinge 302 may be incorporated within a variety of computing devices, including mobile computing devices and desktop computing devices. Further, the device chassis 346, 348 may serve as underlying structure for any two hinged components (e.g., a keyboard, a display screen, a touchscreen, a touchpad, a kickstand, a screen cover, and combinations thereof). Still further, multiples of the hinge 302 arranged in a line may be used in a singular computing device.

The hinge 302 is designed to pivot the hinge guides about pivot axes 308, 310 to achieve a substantially 360-degree operating range. The sliding covers 314, 316 are used to conceal variable gaps between the device chassis 346, 348 and device spine 322. The operating range of the hinge 302 may range from fully closed (or where the device chassis 346 overlies the device chassis 348 on one side with a 0-10 degree angle therebetween) to fully open (or where the device chassis 346 overlies the device chassis 348 on opposite sides with a 0-10 degree angle therebetween), which is referred to herein as a substantially 360-degree operating range.

The device spine 322 functions as a fixed reference for the computing device 300 and defines pivot link axes 332, 334 to which dual pivot links 328, 330 are hingedly attached. The dual pivot links 328, 330 further define pivot link axes 336, 338 to which the sliding covers 314, 316 are hingedly attached. In sum, the dual pivot links 328, 330 are used to create articulated attachments between the device spine 322 and the sliding covers 314, 316. The dual pivot links 328, 330 are rigid members that utilize the pivot link axes 332, 334, 336, 338 to permit the sliding covers 314, 316 to stay in the same plane as the device chassis 346, 348, respectively, when extended and retracted with reference to the device chassis 346, 348. This is technically advantageous as the dual pivot links 328, 330 drive translation (sliding) of the sliding covers 314, 316, respectively, in a deterministic manner—so that the sliding covers 314, 316 does not need to be spring loaded, as in some prior art. This is further technically advantageous as the sliding covers 314, 316 staying in the same plane as the device chassis 346, 348 when extended and retracted consumes less internal space within the computing device 300 and is more attractive in operation to a user (i.e., additional gaps do not appear as a result of the sliding covers 314, 316 changing angle).

Further, while dual pivot links 328, 330 may be rigid members, living hinge points may be utilized at the pivot link axes 332, 334, 336, 338 (e.g., one living hinge between the sliding cover 314 and the dual pivot link 328, and another living hinge between the dual pivot link 328 and the device spine 322). In other implementations, the dual pivot links 328, 330 are flexible structures themselves that function as living hinges, replacing the pivot link axes 332, 334, 336, 338 with flexure spread over a length of the dual pivot links 328, 330 between the device spine 322 and the sliding covers 314, 316. The flexible dual pivot links 328, 330 may be technically advantageous as they may be lower-cost parts and spreading the flexure over a length of the dual pivot links 328, 330 allows more flexibility in design as compared to two fixed pivot rigid link axes.

The sliding covers 314, 316 are slidably attached to the hinge guides (e.g., via a plain sliding bearing), thereby limiting movement to translation in the directions of arrows 342, 344. The translation arrow 342 and the planes of the sliding cover 314 and the device chassis 346 remain substantially parallel in all orientations of the computing device 300. Similarly, the translation arrow 344 and the planes of the sliding cover 316 and the device chassis 348 remain substantially parallel in all orientations of the computing device 300.

The device chassis 346, 348 overlap the sliding covers 314, 316, respectively, thereby concealing gaps of varying size depending on the computing device 300 orientation that would otherwise be present between the device chassis 346, 348 and the device spine 322. The sliding covers 314, 316 are depicted in a partial extension orientation in in the depicted 180-degree orientation of FIG. 3. Absent the sliding covers 314, 316, interior components of the computing device 300 would be visible through the hinge 302 in some orientations, which is not desirable.

Other implementations may utilize a singular pivot axis (approximately one-half of the hinge 302 discussed in detail herein). Functionally, one of the device chassis 346, 348 is used as a fixed reference in place of the device spine 322 as the other of the device chassis 346, 348 pivots along with its hinge guide. The operating range of such a hinge may range from fully closed (or where the device chassis 346 overlies the device chassis 348 on one side with a 0-10 degree angle therebetween) to fully open (or where the device chassis 346 is oriented at a maximum oblique angle with reference to the device chassis 348, which may include an approximately 180-degree angle (i.e., 170-190 degrees) therebetween), which is referred to herein as a substantially 180-degree operating range.

FIG. 4A is a bottom perspective view of an example computing device 400 having a hinge 402 at an approximately 45-degree orientation with a pair of sliding covers 414, 416. The hinge 402 pivotally connects first hinged component (or hinge guide) 404 to a second hinged component (or hinge guide) 406 of the computing device 400, which is not drawn to scale. The computing device 400 further includes a first device chassis 446 and a second device chassis 448, each of which is fixedly or slidably attached to their respective hinge guides. In implementations where the device chassis 446, 448 are slidably attached to their respective hinge guides, movement of the device chassis 446, 448 with reference to their respective hinge guides may be dependent upon or independent of movement of the sliding covers 414, 416 (described in detail below) with reference to their respective hinge guides 404, 406.

A user may position the first device chassis 446 at a variety of angles with respect to the second device chassis 448 to achieve a desired orientation of the device chassis 446, 448, or for other user considerations. The hinge 402 may be incorporated within a variety of computing devices, including mobile computing devices and desktop computing devices. Further, the device chassis 446, 448 may serve as underlying structure for any two hinged components (e.g., a keyboard, a display screen, a touchscreen, a touchpad, a kickstand, a screen cover, and combinations thereof). Still further, multiples of the hinge 402 arranged in a line may be used in a singular computing device.

The hinge 402 is designed to pivot the device chassis 446, 448 using the hinge guides 404, 406 to achieve a substantially 360-degree operating range. The sliding covers 414, 416 are used to conceal variable gaps between the device chassis 446, 448 and device spine 422, which is technically advantageous as the variable gaps are unsightly and may otherwise permit ingress of contaminates (e.g., water and/or dirt) and even a user's fingers, if the variable gaps are large enough. The operating range of the hinge 402 may range from fully closed (or where the device chassis 446 overlies the device chassis 448 on one side with a 0-10 degree angle therebetween) to partially open (e.g., at approximately 45-degree orientation, as illustrated in FIG. 4A), to fully open (or where the device chassis 446 overlies the device chassis 448 on opposite sides with a 0-10 degree angle therebetween), which is referred to herein as a substantially 360-degree operating range.

The device spine 422 functions as a fixed reference for the computing device 400 to which dual pivot links 428, 430 are hingedly attached. The sliding covers 414, 416 are hingedly attached to the dual pivot links 428, 430. In sum, the dual pivot links 428, 430 are used to create articulated attachments between the device spine 422 and the sliding covers 414, 416. The dual pivot links 428, 430 permit the sliding covers 414, 416 to stay in the same plane as the device chassis 446, 448, respectively, when extended and retracted with reference to the device chassis 446, 448. The sliding covers 414, 416 are slidably attached to the hinge guides 404, 406, respectively, thereby limiting movement to translation along a singular axis. This is technically advantageous as the dual pivot links 428, 430 drive translation (sliding) of the sliding covers 414, 416, respectively, in a deterministic manner—so that the sliding covers 414, 416 does not need to be spring loaded, as in some prior art. This is further technically advantageous as the sliding covers 414, 416 staying in the same plane as the device chassis 446, 448 when extended and retracted consumes less internal space within the computing device 400 and is more attractive in operation to a user (i.e., additional gaps do not appear as a result of the sliding covers 414, 416 changing angle).

The device chassis 446, 448 overlap the sliding covers 414, 416, respectively, thereby concealing gaps of varying size depending on the computing device 400 orientation that would otherwise be present between the device chassis 446, 348 and the device spine 422. The sliding covers 414, 416 are depicted in a partial extension orientation in in the depicted 45-degree orientation of FIG. 4A. Absent the sliding covers 414, 416, interior components of the computing device 400 may be visible through the hinge 402.

Other implementations may utilize a singular pivot axis (approximately one-half of the hinge 402 discussed in detail herein). Functionally, one of the device chassis 446, 448 is used as a fixed reference in place of the device spine 422 as the other of the device chassis 446, 448 pivots along with its hinge guide. The operating range of such a hinge may range from fully closed (or where the device chassis 446 overlies the device chassis 448 on one side with a 0-10 degree angle therebetween) to fully open (or where the device chassis 446 is oriented at a maximum oblique angle with reference to the device chassis 448, which may include an approximately 180-degree angle (i.e., 170-190 degrees) therebetween), which is referred to herein as a substantially 180-degree operating range.

FIG. 4B is a bottom perspective view of the example computing device 400 of FIG. 4A at an approximately 135-degree orientation. The hinge 402 permits the computing device 400 to move from the approximately 45-degree orientation of FIG. 4A to the approximately 135-degree orientation of FIG. 4B. As compared to the approximately 45-degree orientation of FIG. 4A, the device chassis 446, 448 further overlaps the sliding covers 414, 416 as gaps between the device chassis 446, 448 and the device spine 422 close at the approximately 135-degree orientation of FIG. 4B. The dual pivot links 428, 430 articulate to permit the sliding covers 414, 416 to stay in the same plane as the device chassis 446, 448, as the sliding covers 414, 416 retract into the device chassis 446, 448, respectively.

FIG. 4C is a bottom perspective view of the example computing device 400 of FIGS. 4A and 4B at an approximately 250-degree orientation. The hinge 402 permits the computing device 400 to move from the approximately 135-degree orientation of FIG. 4B to the approximately 250-degree orientation of FIG. 4C. As compared to the approximately 135-degree orientation of FIG. 4B, the device chassis 446, 448 fully overlaps the sliding covers 414, 416 and partially overlaps the dual pivot links 428, 430 as gaps between the device chassis 446, 448 and the device spine 422 further close at the approximately 250-degree orientation of FIG. 4C. The dual pivot links 428, 430 articulate to permit the sliding covers 414, 416 to stay in the same plane as the device chassis 446, 448, as the sliding covers 414, 416 and dual pivot links 428, 430 retract into the device chassis 446, 448, respectively.

Figure 5A:
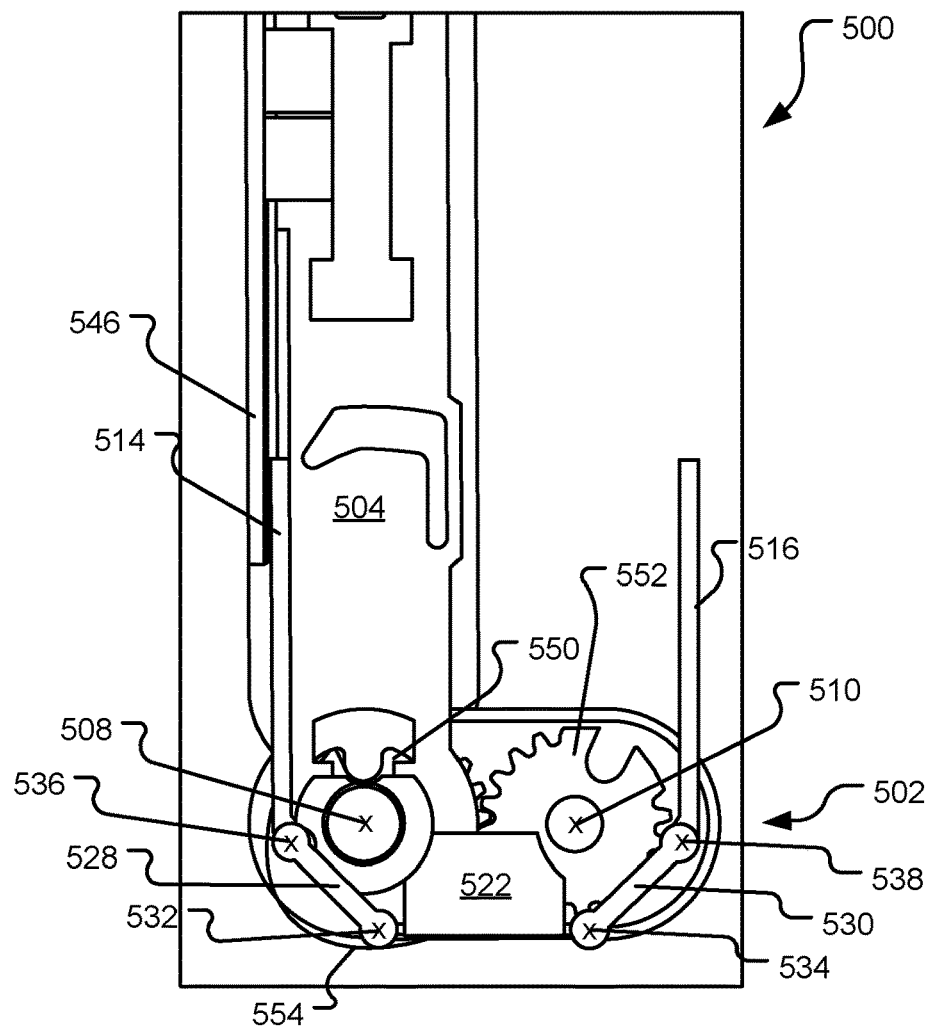
FIG. 5A is a sectional view of an example computing device having a hinge at an approximately 0-degree orientation with a pair of sliding covers.

FIG. 5A is a sectional view of an example computing device 500 having a hinge 502 at an approximately 0-degree orientation with a pair of sliding covers 514, 516. The hinge 502 pivotally connects first hinged component (or hinge guide) 504 to a second hinged component (or hinge guide, not shown, mirror image of hinge guide 504) of the computing device 500, which is not drawn to scale. The computing device 500 further includes a first device chassis 546 and a second device chassis (not shown, mirror image of first device chassis 546), each of which is fixedly or slidably attached to their respective hinge guides.

A user may position the first device chassis 546 at a variety of angles with respect to the second device chassis to achieve a desired orientation of the computing device 500, or for other user considerations. Gears 550, 552 constrain rotation of the first device chassis 546 with reference to device spine 522 to equal rotation of the second device chassis with reference to device spine 522 so that the computing device 500 changes its angular orientation in a predictable manner. The hinge 502 may be incorporated within a variety of computing devices, including mobile computing devices and desktop computing devices. Further, the first device chassis 546 and the second device chassis may each serve as underlying structure for any two hinged components (e.g., a keyboard, a display screen, a touchscreen, a touchpad, a kickstand, a screen cover, and combinations thereof). Still further, multiples of the hinge 502 arranged in a line may be used in a singular computing device.

The hinge 502 is designed to pivot the first hinge guide 504 about pivot axis 508 and the second hinge guide about pivot axis 510 to achieve a substantially 360-degree operating range. The sliding cover 514 is used to conceal a variable gap between the first device chassis 546 and the device spine 522 and the sliding cover 516 is used to conceal a variable gap between the second device chassis and the device spine 522. The operating range of the hinge 502 may range from fully closed (or where the first device chassis 546 overlies the second device chassis on one side with a 0-10 degree angle therebetween, as shown in FIG. 5A) to fully open (or where the first device chassis 546 overlies the second device chassis on opposite sides with a 0-10 degree angle therebetween, as shown in FIG. 6B), which is referred to herein as a substantially 360-degree operating range.

The device spine 522 functions as a fixed reference for the computing device 500 and defines pivot link axes 532, 534 to which dual pivot links 528, 530 are hingedly attached. The dual pivot links 528, 530 further define pivot link axes 536, 538 to which the sliding covers 514, 516 are hingedly attached. In sum, the dual pivot links 528, 530 are used to create articulated attachments between the device spine 522 and the sliding covers 514, 516. The sliding covers 514, 516 are slidably attached to the hinge guides, thereby limiting movement to translation along a singular axis. This is technically advantageous as the dual pivot links 528, 530 drive translation (sliding) of the sliding covers 514, 516, respectively, in a deterministic manner—so that the sliding covers 514, 516 does not need to be spring loaded, as in some prior art. This is further technically advantageous as the sliding covers 514, 516 staying in the same plane as the device chassis when extended and retracted consumes less internal space within the computing device 500 and is more attractive in operation to a user (i.e., additional gaps do not appear as a result of the sliding covers 514, 516 changing angle).

The first device chassis 546 overlaps the sliding cover 514 and the second device chassis overlaps the sliding cover 516, thereby concealing gaps of varying size depending on the computing device 500 angular orientation. The sliding covers 514, 516 are depicted in a full extension orientation in in the depicted 0-degree orientation of FIG. 5A. Absent the sliding covers 514, 516, interior components of the computing device 500 may be visible through the hinge 502.

Other implementations may utilize a singular pivot axis (approximately one-half of the hinge 502 discussed in detail herein). Functionally, the second device chassis is used as a fixed reference in place of the device spine 522 as the first device chassis 546 pivots along with its hinge guide 504. The operating range of such a hinge may range from fully closed (or where the first device chassis 546 overlies the second device chassis on one side with a 0-10 degree angle therebetween) to fully open (or where the first device chassis 546 is oriented at a maximum oblique angle with reference to the second device chassis, which may include an approximately 180-degree angle (i.e., 170-190 degrees) therebetween), which is referred to herein as a substantially 180-degree operating range.

The computing device 500 may include a living hinge cover 554 that is applied to interior or exterior facing surfaces of the device spine 522, the first dual pivot link 528, and the first sliding cover 514 to provide a seal and in the case of an exterior living hinge cover 554, conceal hinged connections at the pivot link axes 532, 536. By concealing the hinged connections, the living hinge cover 554 is technically advantageous by preventing possible pinch points at the hinged connections and preventing ingress of contaminates (e.g., water and/or dirt) at the hinged connections. In other implementations, the living hinge cover 554 or a separate second living hinge cover is further applied to exterior facing surfaces of the device spine 522, the second dual pivot link 530, and the second sliding cover 516. In still further implementations the living hinge cover 554 is omitted.

Figure 5B:
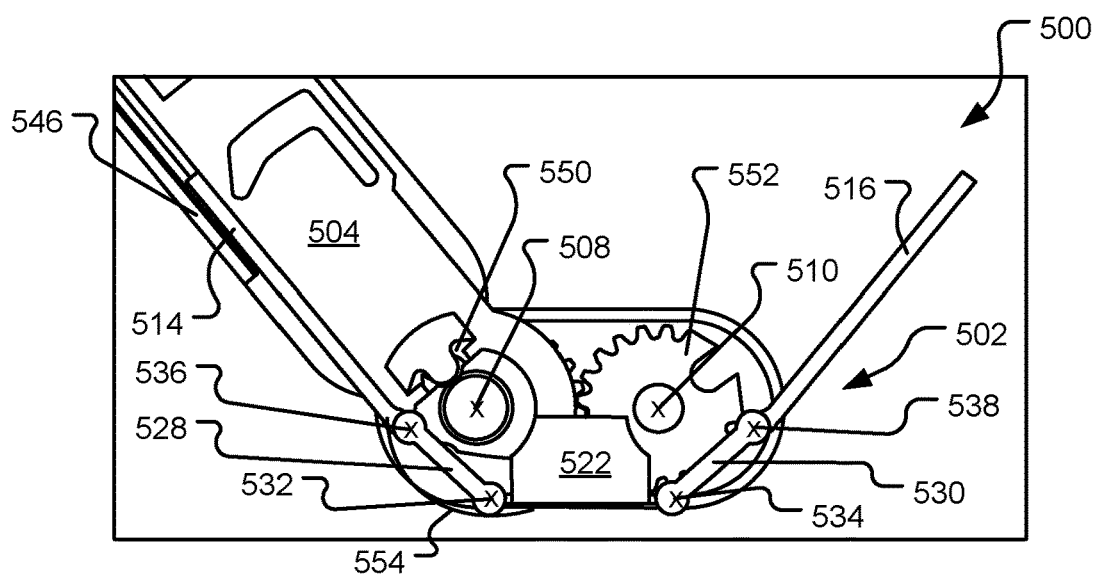
FIG. 5B is a sectional view of the example computing device of FIG. 5A at an approximately 90-degree orientation.

FIG. 5B is a bottom perspective view of the example computing device 500 of FIG. 5A at an approximately 90-degree orientation. The hinge 502 permits the computing device 500 to move from the approximately 0-degree orientation of FIG. 5A to the approximately 90-degree orientation of FIG. 5B. As compared to the approximately 0-degree orientation of FIG. 5A, the device chassis 546 further overlaps the sliding cover 514 as the gap between the device chassis 546 and the device spine 522 partially closes at the approximately 90-degree orientation of FIG. 5B. The dual pivot link 528 articulates to permit the sliding cover 514 to stay in the same plane as the device chassis 546, as the sliding cover 514 retracts into the device chassis 546.

Figure 6A:
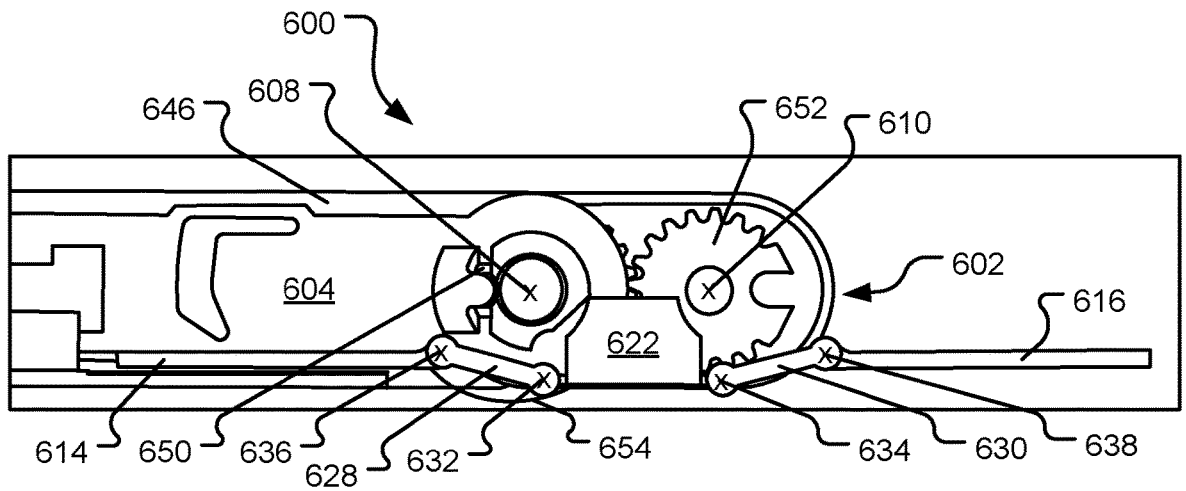
FIG. 6A is a sectional view of the example computing device of FIGS. 5A and 5B at an approximately 180-degree orientation.
Figure 6B:
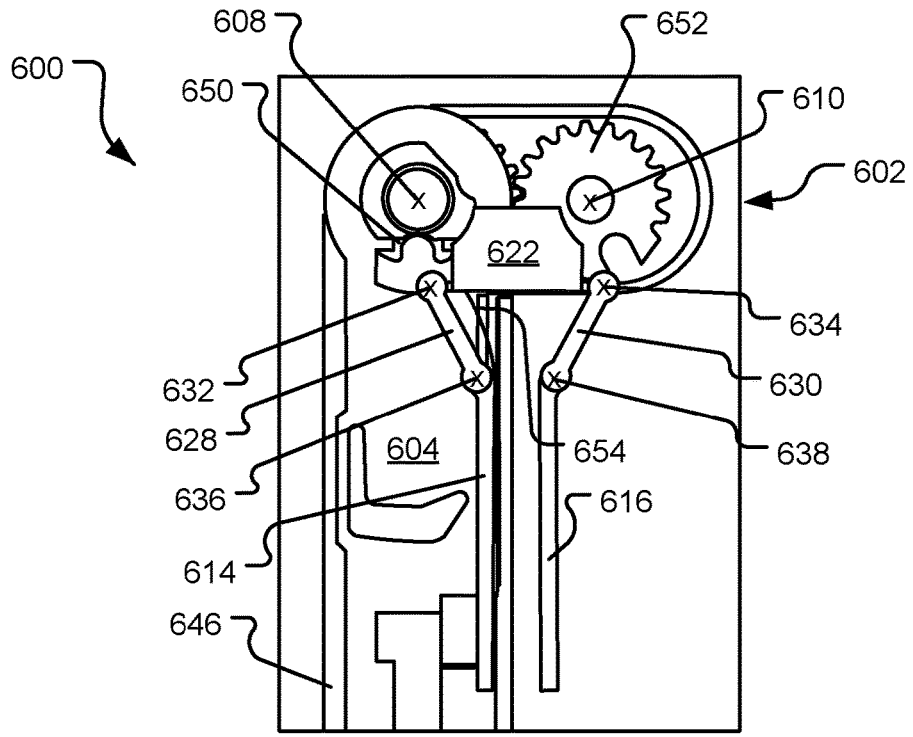
FIG. 6B is a sectional view of the example computing devices of FIGS. 5A, 5B, and 6A at an approximately 360-degree orientation.

FIG. 6A is a sectional view of the example computing device 500 of FIGS. 5A and 5B at an approximately 180-degree orientation. The hinge 602 pivotally connects first hinged component (or hinge guide) 604 to a second hinged component (or hinge guide, not shown, mirror image of hinge guide 604) of computing device 600, which is not drawn to scale. The computing device 600 further includes a first device chassis 646 and a second device chassis (not shown, mirror image of first device chassis 546), each of which is fixedly or slidably attached to their respective hinge guides.

A user may position the first device chassis 646 at a variety of angles with respect to the second device chassis to achieve a desired orientation of the computing device 600, or for other user considerations. Gears 650, 652 constrain rotation of the first device chassis 646 with reference to device spine 622 to equal rotation of the second device chassis with reference to device spine 622 so that the computing device 500 changes its angular orientation in a predictable manner. The hinge 602 may be incorporated within a variety of computing devices, including mobile computing devices and desktop computing devices. Further, the first device chassis 646 and the second device chassis may each serve as underlying structure for any two hinged components (e.g., a keyboard, a display screen, a touchscreen, a touchpad, a kickstand, a screen cover, and combinations thereof). Still further, multiples of the hinge 602 arranged in a line may be used in a singular computing device.

The hinge 602 is designed to pivot the first hinge guide 604 about pivot axis 608 and the second hinge guide about pivot axis 610 to achieve a substantially 360-degree operating range. Sliding cover 614 is used to conceal a variable gap between the first device chassis 646 and the device spine 622 and sliding cover 616 is used to conceal a variable gap between the second device chassis and the device spine 622. The operating range of the hinge 602 may range from fully closed (or where the first device chassis 646 overlies the second device chassis on one side with a 0-10 degree angle therebetween, as shown in FIG. 5A) to fully open (or where the first device chassis 646 overlies the second device chassis on opposite sides with a 0-10 degree angle therebetween, as shown in FIG. 6B), which is referred to herein as a substantially 360-degree operating range.

The device spine 622 functions as a fixed reference for the computing device 600 and defines pivot link axes 632, 634 to which dual pivot links 628, 630 are hingedly attached. The dual pivot links 628, 630 further define pivot link axes 636, 638 to which the sliding covers 614, 616 are hingedly attached. In sum, the dual pivot links 628, 630 are used to create articulated attachments between the device spine 622 and the sliding covers 614, 616. The sliding covers 614, 616 are slidably attached to the hinge guides, thereby limiting movement to translation along a singular axis. This is technically advantageous as the dual pivot links 628, 630 drive translation (sliding) of the sliding covers 614, 616, respectively, in a deterministic manner—so that the sliding covers 614, 616 does not need to be spring loaded, as in some prior art. This is further technically advantageous as the sliding covers 614, 616 staying in the same plane as the device chassis when extended and retracted consumes less internal space within the computing device 600 and is more attractive in operation to a user (i.e., additional gaps do not appear as a result of the sliding covers 614, 616 changing angle).

The first device chassis 646 overlaps the sliding cover 614 and the second device chassis overlaps the sliding cover 616, thereby concealing gaps of varying size depending on the computing device 600 angular orientation. The sliding covers 614, 616 are depicted in a partial extension orientation in in the depicted 180-degree orientation of FIG. 6A. Absent the sliding covers 614, 616, interior components of the computing device 600 may be visible through the hinge 602.

Other implementations may utilize a singular pivot axis (approximately one-half of the hinge 602 discussed in detail herein). Functionally, the second device chassis is used as a fixed reference in place of the device spine 622 as the first device chassis 646 pivots along with its hinge guide 604. The operating range of such a hinge may range from fully closed (or where the first device chassis 646 overlies the second device chassis on one side with a 0-10 degree angle therebetween) to fully open (or where the first device chassis 646 is oriented at a maximum oblique angle with reference to the second device chassis, which may include an approximately 180-degree angle (i.e., 170-190 degrees) therebetween), which is referred to herein as a substantially 180-degree operating range.

The computing device 600 may include a living hinge cover 654 that is applied to exterior facing surfaces of the device spine 622, the first dual pivot link 628, and the first sliding cover 614 to conceal hinged connections at the pivot link axes 632, 636. In other implementations, the living hinge cover 654 or a separate second living hinge cover is further applied to exterior facing surfaces of the device spine 622, the second dual pivot link 630, and the second sliding cover 616. In still further implementations the living hinge cover 654 is omitted.

FIG. 6B is a sectional view of the example computing devices 500, 600 of FIGS. 5A, 5B, and 6A at an approximately 360-degree orientation. The hinge 602 permits the computing device 600 to move from the approximately 180-degree orientation of FIG. 6A to the approximately 360-degree orientation of FIG. 6B. As compared to the approximately 180-degree orientation of FIG. 6A, the device chassis 646 fully overlaps the sliding cover 614 and the first dual pivot link 628 as the gap between the device chassis 646 and the device spine 622 fully closes at the approximately 360-degree orientation of FIG. 6B. The dual pivot link 628 articulates to permit the sliding cover 614 to stay in the same plane as the device chassis 646, as the sliding cover 614 retracts into the device chassis 646.

Figure 7:
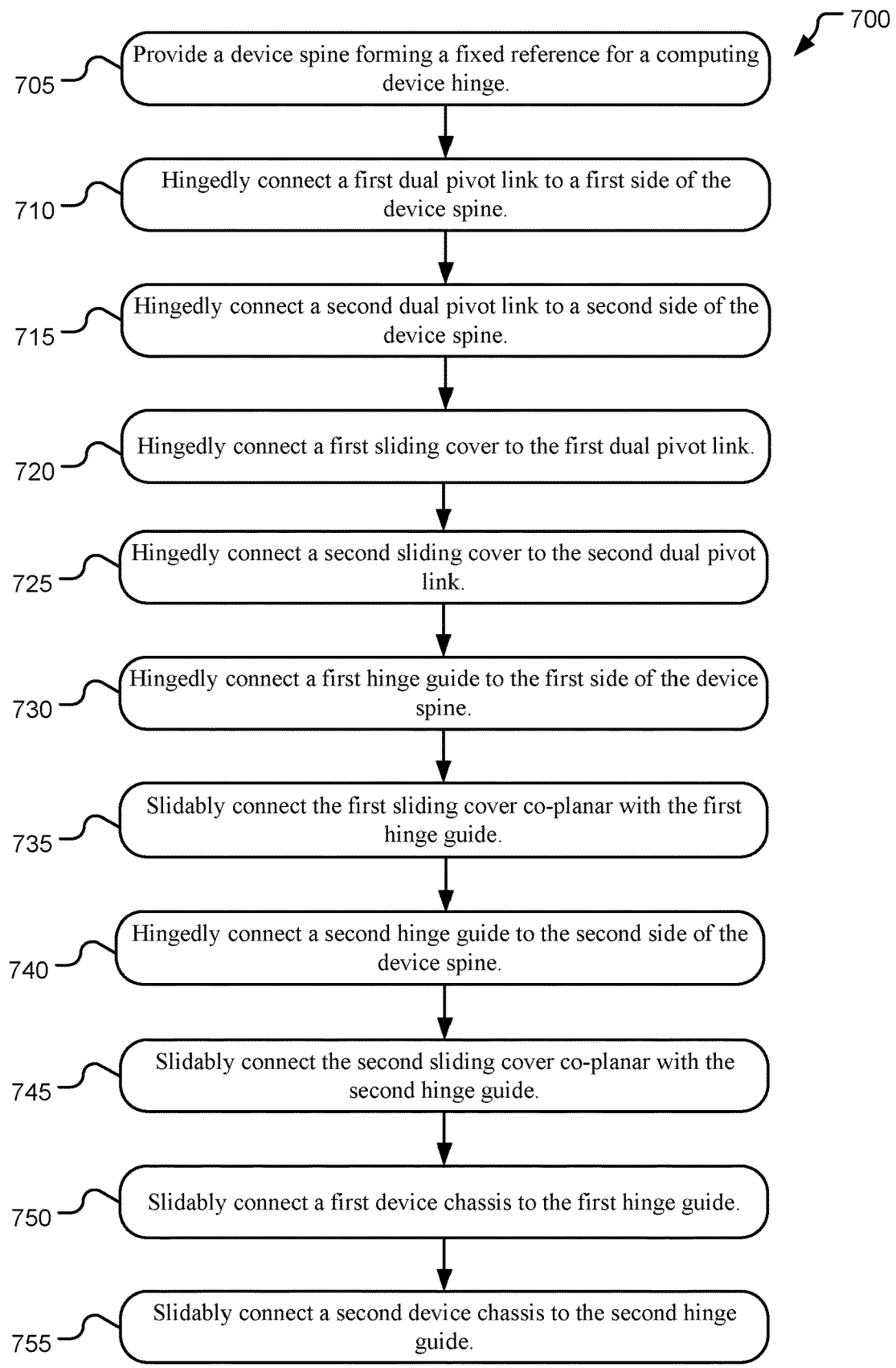
FIG. 7 illustrates example operations for manufacturing a computing device hinge with sliding covers.

FIG. 7 illustrates example operations 700 for manufacturing a computing device hinge with sliding covers. A providing operation 705 provides a device spine forming a fixed reference for the computing device hinge. The device spine defines a first pair of pivot link axes. A first hingedly connecting operation 710 hingedly connects a first dual pivot link to a first side of the device spine at one of the first pair of pivot link axes. A second hingedly connecting operation 715 hingedly connects a second dual pivot link to a second side of the device spine at the other one of the first pair of pivot link axes. The first and second dual pivot links each define a further pivot link axis.

A third hingedly connecting operation 720 hingedly connects a first sliding cover to the first dual pivot link at one of the further pivot link axes. A fourth hingedly connecting operation 725 hingedly connects a second sliding cover to the second dual pivot link at the other of the further pivot link axes. The first and the second sliding covers conceal gaps in the computing device hinge across the range of hinged motion of the computing device hinge.

A fifth hingedly connecting operation 730 hingedly connects a first hinge guide to the first side of the device spine. A first slidably connecting operation 735 slidably connects the first sliding cover co-planar with the first hinge guide. The first sliding cover is translatable along the first hinge guide across a range of hinged motion of the computing device hinge.

A sixth hingedly connecting operation 740 hingedly connects a second hinge guide to the second side of the device spine. A second slidably connecting operation 745 slidably connects the second sliding cover co-planar with the second hinge guide. The second sliding cover is translatable along the second hinge guide across the range of hinged motion of the computing device hinge.

A third slidably connecting operation 750 slidably connects a first device chassis to the first hinge guide. A fourth slidably connecting operation 755 slidably connects a second device chassis to the second hinge guide. The first device chassis overlaps the first sliding cover and the second device chassis overlaps the second sliding cover, thereby concealing gaps of varying size depending on the computing device angular orientation.

The device spine, dual pivot links, sliding covers, hinge guides, and device chassis may be formed using any applicable manufacturing method (e.g., metal-injection molding, other molding techniques, extruding, casting, stamping, and so on). In some implementations, multiple discrete computing device hinges may be used to connect a first hinged component to a second hinged component of the computing device.

The logical operations making up the embodiments of the invention described herein may be referred to variously as operations, steps, objects, or modules and may be performed in any order, adding or omitting operations as desired, unless explicitly claimed otherwise or a specific order is inherently necessitated by the claim language.

Implementations disclosed and claimed herein provide an example computing device hinge comprising: a first device chassis forming a fixed reference; a dual pivot link hingedly attached to the first device chassis; a sliding cover hingedly attached to the dual pivot link; and a hinge guide hingedly attached to the first device chassis, the sliding cover co-planar with and slidably attached to the hinge guide, wherein the sliding cover translates along the hinge guide across a range of hinged motion of the computing device hinge.

In another example computing device hinge, the range of hinged motion is approximately 180 degrees.

Another example computing device hinge further comprises a second device chassis fixedly attached to the hinge guide.

Another example computing device hinge further comprises a second device chassis slidably attached to the hinge guide, wherein movement of the second device chassis with reference to the hinge guide is independent of movement of the sliding cover with reference to the hinge guide.

Another example computing device hinge further comprises a second device chassis that overlaps the sliding cover thereby concealing a gap between the first device chassis and the second device chassis.

Another example computing device hinge further comprises a display screen applied to a side of the computing device hinge opposite the sliding cover.

In another example computing device hinge, the dual pivot link is a rigid member with hinge axes defining its hinged attachments to the first device chassis and the sliding cover.

In another example computing device hinge, the dual pivot link is a living hinge with its hinged attachments to the first device chassis and the sliding cover spread over a length of the dual pivot link.

Another example computing device hinge further comprises a living hinge cover applied to exterior facing surfaces of the first device chassis, the dual pivot link, and the sliding cover to conceal hinged connections between the first device chassis, the dual pivot link, and the sliding cover.

Implementations disclosed and claimed herein provide an example method of manufacturing a computing device hinge comprising: provide a device spine forming a fixed reference; hingedly connect a first dual pivot link to a first side of the device spine; hingedly connect a second dual pivot link to a second side of the device spine; hingedly connect a first sliding cover to the first dual pivot link; hingedly connect a second sliding cover to the second dual pivot link; hingedly connect a first hinge guide to the first side of the device spine; slidably connect the first sliding cover co-planar with the first hinge guide, wherein the first sliding cover is translatable along the first hinge guide across a range of hinged motion of the computing device hinge; hingedly connect a second hinge guide to the second side of the device spine; and slidably connect the second sliding cover co-planar with the second hinge guide, wherein the second sliding cover is translatable along the second hinge guide across the range of hinged motion of the computing device hinge.

Another example method of manufacturing a computing device hinge further comprises slidably connect a first device chassis to the first hinge guide; and slidably connect a second device chassis to the second hinge guide.

Implementations disclosed and claimed herein provide another example computing device hinge comprising: a device spine forming a fixed reference; a first dual pivot link hingedly attached to a first side of the device spine; a second dual pivot link hingedly attached to a second side of the device spine; a first sliding cover hingedly attached to the first dual pivot link; a second sliding cover hingedly attached to the second dual pivot link; a first hinge guide hingedly attached to the first side of the device spine, the first sliding cover co-planar with and slidably attached to the first hinge guide, wherein the first sliding cover translates along the first hinge guide across a range of hinged motion of the computing device hinge; and a second hinge guide hingedly attached to the second side of the device spine, the second sliding cover co-planar with and slidably attached to the second hinge guide, wherein the second sliding cover translates along the second hinge guide across the range of hinged motion of the computing device hinge.

In another example computing device hinge, the range of hinged motion is approximately 360 degrees.

Another example computing device hinge further comprises: a first device chassis; and a second device chassis, wherein one or both of: the first device chassis is fixedly attached to the first hinge guide; and the second device chassis is fixedly attached to the second hinge guide.

Another example computing device hinge further comprises: a first device chassis; and a second device chassis, wherein one or both of: the first device chassis is slidably attached to the first hinge guide, wherein movement of the first device chassis with reference to the first hinge guide is independent of movement of the first sliding cover with reference to the first hinge guide; and the second device chassis is slidably attached to the second hinge guide, wherein movement of the second device chassis with reference to the second hinge guide is independent of movement of the second sliding cover with reference to the second hinge guide.

Another example computing device hinge further comprises: a first device chassis that overlaps the first sliding cover thereby concealing a first gap between the first device chassis and the device spine; and a second device chassis that overlaps the second sliding cover thereby concealing a second gap between the second device chassis and the device spine.

Another example computing device hinge further comprises a flexible display screen applied to a side of the computing device hinge opposite the first sliding cover and the second sliding cover.

Another example computing device hinge further comprises a living hinge cover applied to exterior facing surfaces of the device spine, the first dual pivot link, the second dual pivot link, the first sliding cover, and the second sliding cover to conceal hinged connections between the device spine, the first dual pivot link, the second dual pivot link, the first sliding cover, and the second sliding cover.

In another example computing device hinge, the first dual pivot link is a first rigid member with first hinge axes defining its hinged attachments to the device spine and the first sliding cover, and wherein the second dual pivot link is a second rigid member with second hinge axes defining its hinged attachments to the device spine and the second sliding cover.

In another example computing device hinge, the first dual pivot link is a first living hinge with its hinged attachments to the device spine and the first sliding cover spread over a length of the first dual pivot link, and wherein the second dual pivot link is a second living hinge with its hinged attachments to the device spine and the second sliding cover spread over a length of the second dual pivot link.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A computing device hinge comprising:
   a first device chassis forming a fixed reference;
   a dual pivot link hingedly attached to the first device chassis at a first pivot link axis;
   a sliding cover hingedly attached to the dual pivot link at a second pivot link axis; and
   a hinge guide hingedly attached to the first device chassis at a pivot axis, wherein the pivot axis is distinct from the first and the second pivot link axes, the sliding cover is co-planar with and slidably attached to the hinge guide, and the sliding cover translates along the hinge guide across a range of hinged motion of the computing device hinge.

2. The computing device hinge of claim 1, wherein the range of hinged motion is approximately 180 degrees.

3. The computing device hinge of claim 1, further comprising:
   a second device chassis fixedly attached to the hinge guide.

4. The computing device hinge of claim 1, further comprising:
   a second device chassis slidably attached to the hinge guide, wherein movement of the second device chassis with reference to the hinge guide is independent of movement of the sliding cover with reference to the hinge guide.

5. The computing device hinge of claim 1, further comprising:
   a second device chassis that overlaps the sliding cover thereby concealing a gap between the first device chassis and the second device chassis.

6. The computing device hinge of claim 1, further comprising:
   a display screen applied to a side of the computing device hinge opposite the sliding cover.

7. The computing device hinge of claim 1, wherein the dual pivot link is a rigid member with the first and second pivot link axes defining its hinged attachments to the first device chassis and the sliding cover.

8. The computing device hinge of claim 1, further comprising:
   a living hinge cover applied to exterior facing surfaces of the first device chassis, the dual pivot link, and the sliding cover to conceal hinged connections between the first device chassis, the dual pivot link, and the sliding cover.

9. The computing device hinge of claim 1, further comprising:
   a second device chassis;
   a second dual pivot link hingedly attached to the second device chassis at a third pivot link axis;
   a second sliding cover hingedly attached to the second dual pivot link at a fourth pivot link axis;
   a second hinge guide hingedly attached to the second device chassis at a second pivot axis, wherein the second pivot axis is distinct from the third and the fourth pivot link axes, the second sliding cover is co-planar with and slidably attached to the second hinge guide, and the second sliding cover translates along the second hinge guide across a range of hinged motion of the computing device hinge;

a device spine serving as the fixed reference for the first device chassis and the second device chassis.

10. The computing device hinge of claim 9, further comprising:
a set of gears to constrain rotation of the first device chassis with reference to the device spine to equal rotation of the second device chassis with reference to the device spine.

11. A method of manufacturing a computing device hinge comprising:
provide a device spine forming a fixed reference;
hingedly connect a first dual pivot link to a first side of the device spine at a first pivot link axis;
hingedly connect a second dual pivot link to a second side of the device spine at a second pivot link axis;
hingedly connect a first sliding cover to the first dual pivot link at a third pivot link axis;
hingedly connect a second sliding cover to the second dual pivot link at a fourth pivot link axis;
hingedly connect a first hinge guide to the first side of the device spine at a first pivot axis, wherein the first pivot axis is distinct from the first, second, third and fourth pivot link axes;
slidably connect the first sliding cover co-planar with the first hinge guide, wherein the first sliding cover is translatable along the first hinge guide across a range of hinged motion of the computing device hinge;
hingedly connect a second hinge guide to the second side of the device spine at a second pivot axis, wherein the second pivot axis is distinct from the first, second, third and fourth pivot link axes; and
slidably connect the second sliding cover co-planar with the second hinge guide, wherein the second sliding cover is translatable along the second hinge guide across the range of hinged motion of the computing device hinge.

12. The method of claim 11, further comprising:
slidably connect a first device chassis to the first hinge guide; and
slidably connect a second device chassis to the second hinge guide.

13. A computing device hinge comprising:
a device spine forming a fixed reference;
a first dual pivot link hingedly attached to a first side of the device spine at a first pivot link axis;
a second dual pivot link hingedly attached to a second side of the device spine at a second pivot link axis;
a first sliding cover hingedly attached to the first dual pivot link at a third pivot link axis;
a second sliding cover hingedly attached to the second dual pivot link at a fourth pivot link axis;
a first hinge guide hingedly attached to the first side of the device spine at a first pivot axis, wherein the first pivot axis is distinct from the first, second, third and fourth pivot link axes, the first sliding cover co-planar with and slidably attached to the first hinge guide, wherein the first sliding cover translates along the first hinge guide across a range of hinged motion of the computing device hinge; and
a second hinge guide hingedly attached to the second side of the device spine at a second pivot axis, wherein the second pivot axis is distinct from the first, second, third and fourth pivot link axes, the second sliding cover co-planar with and slidably attached to the second hinge guide, wherein the second sliding cover translates along the second hinge guide across the range of hinged motion of the computing device hinge.

14. The computing device hinge of claim 13, wherein the range of hinged motion is approximately 360 degrees.

15. The computing device hinge of claim 13, further comprising:
a first device chassis; and
a second device chassis, wherein one or both of:
the first device chassis is fixedly attached to the first hinge guide; and
the second device chassis is fixedly attached to the second hinge guide.

16. The computing device hinge of claim 13, further comprising:
a first device chassis; and
a second device chassis, wherein one or both of:
the first device chassis is slidably attached to the first hinge guide, wherein movement of the first device chassis with reference to the first hinge guide is independent of movement of the first sliding cover with reference to the first hinge guide; and
the second device chassis is slidably attached to the second hinge guide, wherein movement of the second device chassis with reference to the second hinge guide is independent of movement of the second sliding cover with reference to the second hinge guide.

17. The computing device hinge of claim 13, further comprising:
a first device chassis that overlaps the first sliding cover thereby concealing a first gap between the first device chassis and the device spine; and
a second device chassis that overlaps the second sliding cover thereby concealing a second gap between the second device chassis and the device spine.

18. The computing device hinge of claim 13, further comprising:
a flexible display screen applied to a side of the computing device hinge opposite the first sliding cover and the second sliding cover.

19. The computing device hinge of claim 13, further comprising:
a living hinge cover applied to exterior facing surfaces of the device spine, the first dual pivot link, the second dual pivot link, the first sliding cover, and the second sliding cover to conceal hinged connections between the device spine, the first dual pivot link, the second dual pivot link, the first sliding cover, and the second sliding cover.

20. The computing device hinge of claim 13, wherein the first dual pivot link is a first rigid member with the first and third pivot link axes defining its hinged attachments to the device spine and the first sliding cover, and wherein the second dual pivot link is a second rigid member with the second and fourth pivot link axes defining its hinged attachments to the device spine and the second sliding cover.

* * * * *